United States Patent [19]

Crossland et al.

[11] Patent Number: 4,626,074

[45] Date of Patent: Dec. 2, 1986

[54] ILLUMINATED LIQUID/CRYSTAL DISPLAY DEVICE USING INTERNAL REFLECTION AND SCATTERING

[75] Inventors: William A. Crossland, Harlow; John R. Brocklehurst, Bishop's Stortford; Peter J. Ayliffe, Stortford; Arthur Atkinson, Addingham, Nr. Ilkley, all of England

[73] Assignee: International Standard Electric Corporation, New York, N.Y.

[21] Appl. No.: 605,508

[22] Filed: Apr. 30, 1984

[30] Foreign Application Priority Data

May 5, 1983 [GB] United Kingdom ................. 8312277

[51] Int. Cl.$^4$ ............................................. G02F 1/13
[52] U.S. Cl. .................. 350/345; 350/339 R
[58] Field of Search ............................ 350/339 R, 345

[56] References Cited

U.S. PATENT DOCUMENTS 3,910,681  10/1975  Elliott et al. ................... 350/345 X
4,334,735   6/1982  Hareng et al. ..................... 350/351

*Primary Examiner*—John K. Corbin
*Assistant Examiner*—Richard Gallivan
*Attorney, Agent, or Firm*—J. M. May; T. L. Peterson

[57] ABSTRACT

A relatively shallow arrangement for providing illumination for a light scattering type display cell employs a transparent sheet in optical contact with the front surface of the cell and a matte black sheet out of contact with the rear surface. The assembly acts as a light guide for light launched into at least one of the transparent sheet from at least one strip lamp. The only light escaping from the display, etc. in the direction of the observer is a proportion of that scattered into non-guided directions by regions of liquid crystal layer selectively set into a scattering state.

9 Claims, 1 Drawing Figure

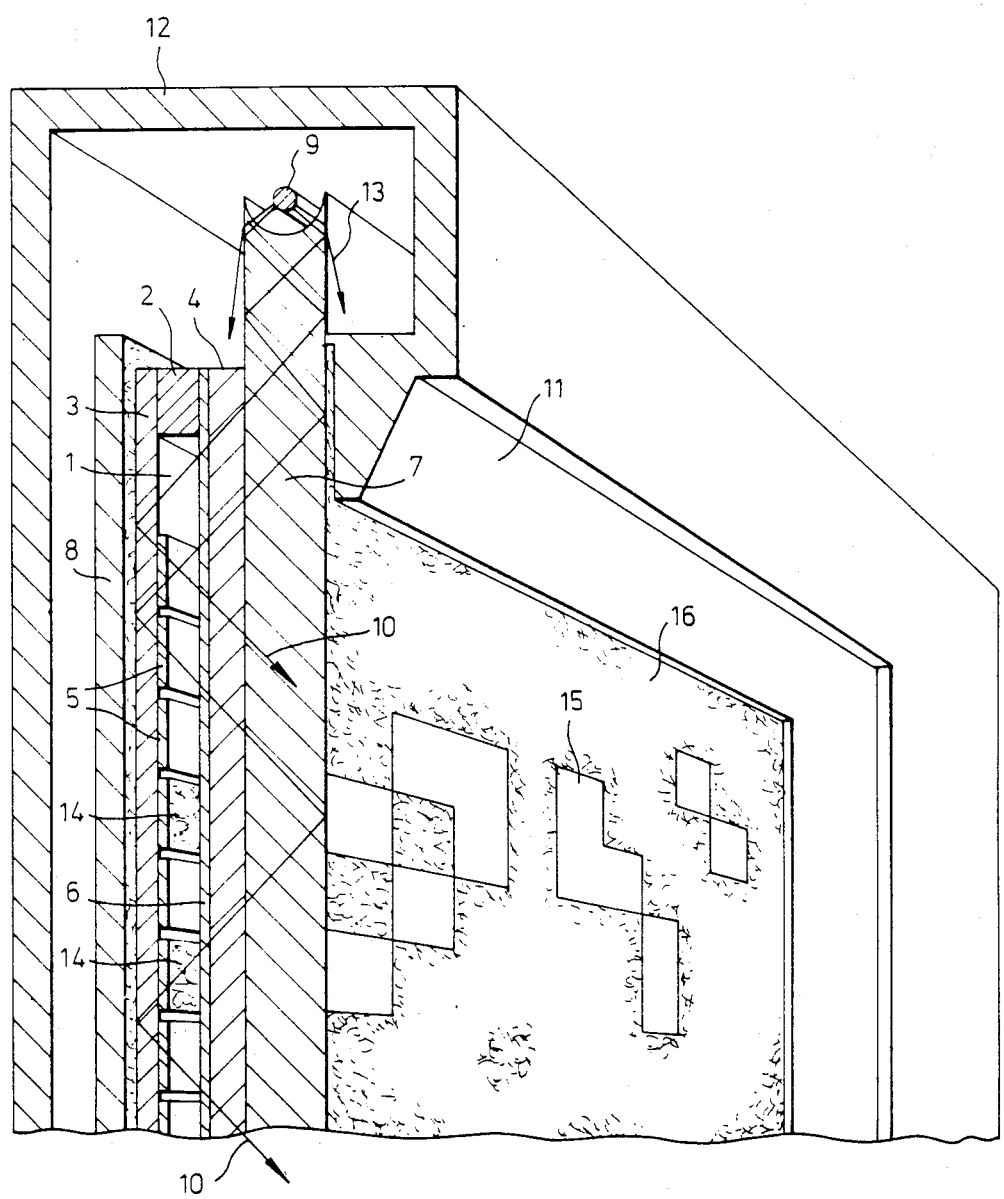

ILLUMINATED LIQUID/CRYSTAL DISPLAY DEVICE USING INTERNAL REFLECTION AND SCATTERING

TECHNICAL FIELD

This invention relates to electronically addressable display devices, and in particular to the way in which such devices are illuminated. The invention finds particular though not necessarily exclusive application in the illumination of liquid crystal display devices of scattering mode type.

BACKGROUND ART

One method that has been employed for illuminating scattering mode type liquid crystal display devices has been to back the display with an "optical louver" and to mount a light box behind the optical louver. The optical louver, which may be for instance of the type marketed by the 3M Company, allows light to pass through it within a narrow angular range which lies entirely outside the viewing angle range of the display device. Thus the observer cannot directly see the illuminating light, but only that which is scattered by scattering regions of the liquid crystal layer of the display device.

A drawback of this optical louver approach to the provision of illumination for the display is that it is generally found that, unless some form of lighting array is provided, the light box needs to be quite deep in order to secure adequately even illumination across the whole display area. Under these circumstances any advantage of the display cell thinness, as compared for instance with a conventional CRT, is effectively wasted.

DISCLOSURE OF INVENTION

The present invention is concerned with illuminating the display area of an electronically addressable display device under conditions in which substantially all of the light is trapped by internal reflection unless scattered by one or more selected regions of the electronically addressable layer of the device.

According to the present invention there is provided a display device which has an electronically addressable layer and which incorporates means for directing light into that layer such that the light is prevented by total internal reflection from emerging from the display area of the device unless scattered by one or more selected regions of the layer, whereby such scattering regions are rendered visible against a background of contrasting appearance.

The invention also provides a liquid crystal display device of scattering mode type, which device has a liquid crystal layer whose two major surfaces are bounded by two transparent sheets secured together with a perimeter seal to form an enclosure for the liquid crystal layer, which device incorporates display illumination means for directing light into the liquid crystal layer within an angular range such that, at least over the display area, substantially all the light is prevented from emerging from the externally facing major surface of either sheet by total internal reflection at these external facing surfaces unless first scattered by a region of the liquid crystal layer, and wherein the rear sheet of the display is backed, at least over the display area, with an out-of-optical-contact dark colored surface having a matte appearance. Preferably, this out-of-optical-contact surface is black.

The number of internal reflections (and the consequent losses in intensity) experienced by the illumination light rays in propagating the full height or width of the display may be reduced by making at least a portion of one of the liquid crystal layer confining sheets thicker than would otherwise be required. A convenient way of providing the requisite thickness is to bring a separate sheet into optical contact with one of the existing (conventional thickness) confining sheets as to form a composite sheet of the required thickness. Optical contact, which is required to prevent losses at the interface between the two components, is conveniently achieved by means of an optical coupling layer which may be an adhesive layer or a layer of a low vapor pressure liquid.

BRIEF DESCRIPTION OF THE DRAWING(S)

There follows a description of a liquid cyrstal display device embodying the invention in a preferred form. The description refers to the accompanying drawing depicting a sectioned perspective schematic view of a part of the device.

BEST MODE FOR CARRYING OUT THE INVENTION

The scattering mode liquid crystal display device illustrated in the drawing employs a matrix array type cell having pixels addressed on a coordinate basis. A preferred display mode for this application is that described by D. Coates et al. in a paper entitled "Electrically induced scattering textures in smectic A phases and their electrical reversal" appearing in the *Journal of Physics D: Applied Physics,* Volume 11, pages 2025-34, and in our United Kingdom Patent Specification No. 1557199 (which corresponds to commonly assigned U.S. Pat. No. 4,139,273). This may involve first using a signal of one frequency to switch a homeotropically aligned smectic liquid crystal material exhibiting positive dielectric anisotropy from a clear state into a dynamic scattering state (which then relaxes in to a static focal-conic scattering state upon removal of the field) and thereafter selectively using a signal of higher frequency to restore the clear homeotropically aligned state in selected areas of the display. That patent specification also refers to the possibility of using thermal cycling as an alternative way of effecting erasure. Such a thermal cycling process is also described in a paper entitled "Flat Matrix Addressed Smectic Liquid Crystal Display" appearing at page 106 in the Digest of Technical Papers of the 1981 Society of Information Display International Symposium (New York, USA), which discloses how erasure may be effected line by line by directing current pulses along the transparent electrode lines to promte localized Joule heating. Alternatively, the device may be switched by pulses after the manner described in our United Kingdom Patent Specification No. 2067811A (which corresponds to commonly assigned U.S. Pat. No. 4,419,664).

Referring to the single FIGURE of the drawing, a hermetic enclosure for a layer 1 of liquid crystal is formed by securing, by means of an edge seal 2, a back transparent sheet 3 to a front transparent sheet 4. Typically, the spacing between these sheets, and thus the thickness of the liquid crystal layer 1, is maintained substantially uniform over the whole display area of the resulting cell in known manner by a dispersal of short lengths of glass fiber (not shown) of uniform diameter distributed through the liquid crystal layer. The inwardly facing surfaces of the front and back sheets 3 and 4 are provided with sets of row and column electrodes 5 and 6, respectively. Typically, these electrodes are made of indium/tin oxide, and their configuration permits the display pixels to be individually addressed on a coordinate basis as taught in the above-referenced U.S. patents.

One sheet, usually the back sheet 3, is typically made thinner than the other sheet (front sheet 4) in order that the former shall readily conform to the surface contour of the inwardly facing surface of the latter. Normally, the thicker sheet is made of glass, and may typically be between 2 to 3 mm thick; whereas the thinner sheet, if made of glass, is typically between 1 and 1.5 mm thicker. For a smaller thickness thinner sheet a polyester film may be used in place of glass. The two surfaces in contact with the major surfaces of the liquid crystal layer 1 are required to be such as to promote the specific type of molecular alignment of the liquid crystal molecules at those surfaces to suit the particular liquid crystal display mode being employed. Treatment of the surfaces to produce the requisite alignment is performed in known manner and may be as disclosed in the above-referenced U.S. patents. In the particular case of the smectic display mode described above, this treatment preferably produces a more or less hemeotropic alignment.

An outer surface of one of the sheets 3 and 4, for example the front surface of the front sheet 4, is in optical contact with a light guiding transparent sheet 7, which may be a sheet of a plastic material that extends beyond at least one edge of sheet 4. The rearmost surface of the sheet is spaced from the matte black surface of a backing sheet 3, 4 and 8. Light, for instance from one or more strip lamps 9 extending along one or more different edges of the light guide sheet 7, is directed into this sheet 7 so that a substantial amount propagates by total internal reflection as illustrated by rays 10. Where the sheet 7 is in optical contact with the liquid crystal display cell front sheet 4, any reflection at the rear face of the light guide sheet 7 is minimized, and instead such internal reflection occurs at the rear face of the rear sheet 3. A bezel 11 forming part of the casing 12 serves to block light (for example light ray 13) from the lamp 9 that is launched into the guiding sheet 7 at too great an angle of incidence relative to the front and rear surfaces of sheet 7 to be trapped within the display by internal reflection and thus could otherwise dazzle the observer of the display.

When the whole of the liquid crystal layer is in its clear (not-scattering state), no light from the lamps 9 is scattered towards the observer, and hence the display appears entirely black by virtue of the blackness of the backing sheet 8. If, however, a part of the layer is set into a scattering state, such as indicated at 14, some of the guided light passing through such regions is scattered, and some of this scattered light is scattered in directions along which the thus scattered light can escape from the cell and reach the eye of the observer. Therefore, the observer will see these scattering regions as luminescent pixel regions 15 set against a dark field 16. It is found in practice that, since the scattering density of a pixel is quite low, the perceived luminous intensity of a scattering pixel 15 near the center of a display area measuring 23 cm by 18 cm is not appreciably diminished by the presence of other scattering pixels located between it and one of the light sources 9. For a display measuring approximately 23 cm by 18 cm adequate illumination was found to be provided by a single pair of 8 watt 16 mm diameter 30 cm long fluorescent lamps mounted against opposite edges of the sheet 9. For other applications a fluorescent lamp mounted against each of the four sides of sheet 9 has been preferred.

An advantage of having the light guiding sheet in optical contact with the thicker of the two sheets confining the liquid crystal layer, and of making this thicker layer the front layer, is that the liquid crystal layer is by this means brought as close as possible to the surface behind the liquid crystal layer. This minimizes parallax problems that create confusion between a given pixel and its image, in the event that any reflective surface is provided behind the cell. In some circumstances however, there are reasons in favor of choosing the opposite layout in which the liquid crystal layer is brought as close as possible to the front surface and the light guiding sheet is provided at the rear of the display cell. In yet other circumstances, the slight increase in parallax resulting from having the light guiding sheet in front of the cell and in contact with the thinner of the two sheets confining the liquid crystal layer may be offset by other advantages. Thus for instance this arrangement gives better mechanical protection for the thinner sheet, which may be particularly desirable in instances where this is made of glass. Also there can be difficulties in achieving good optical contact with the thicker sheet in instances where it contains a hole by which the cell has been filled and this hole is sealed off with a plug that protrudes from the mouth of the hole.

What is claimed is:

1. A liquid crystal display device of the scattering mode type comprising:
   a liquid crystal layer whose two major surfaces are bounded by two transparent sheets secured together with a perimeter seal to form an enclosure for the liquid crystal layer, and
   display illumination means for directing light into said enclosure within an angular range such that, at least over a predetermined display area, substantially all the light is prevented from emerging from the externally facing major surface of either sheet by internal reflection within said display area unless first scattered by a selected region of said liquid crystal layer,
   wherein said display area is backed with a contrasting background surface behind and out of optical contact with said two sheets and having a matte black appearance.

2. A liquid crystal display device as claimed in claim 1, wherein the display device is addressable on a coordinate basis providing pixels defined by the intersection of a set of row electrodes on one major surface of the liquid crystal layer with a set of column electrodes on the other major surface thereof.

3. A liquid crystal display device as claimed in claim 1, wherein the display mode is a smectic display mode.

4. A liquid crystal display device of the scattering mode type comprising:
   a liquid crystal layer whose two major surfaces are bounded by two transparent sheets secured together with a perimeter seal to form an enclosure for the liquid crystal layer, and
   display illumination means for directing light into said enclosure within an angular range such that, at least over a predetermined display area, substantially all the light is prevented from emerging from the externally facing major surface of either sheet by internal reflection within said display area unless first scattered by a selected region of said liquid crystal layer, wherein said display area is backed with a contrasting background surface, wherein at least one of said sheets of the display device is a composite sheet an outer part of which is laminated to an inner part so as to be in optical contact therewith, and wherein said outer part extends beyond the edges of the inner part and forms part of said display illumination means.

5. A liquid crystal display device as claimed in claim 4, wherein said outer part extends beyond the edges of the inner part and forms part of said display illumination means.

6. A liquid crystal display device as claimed in claim 5, wherein the display illumination means further comprises a strip lamp whose axis is aligned with a side edge of said outer part.

7. A liquid crystal display device as claimed in claim 6, wherein said strip lamp is a fluorescent tube strip lamp.

8. A liquid crystal display device as claimed in claim 4, wherein said composite sheet forms the front sheet of the display device.

9. A display device comprising:

an electronically addressable layer of a smectic liquid crystal material confined within a defined display area between front and rear transparent plates having respective transparent electroded inner surfaces in optical contact therewith and means for directing light into said layer such that the light is prevented by internal reflection at respective outer surfaces of said front and rear plates from emerging from the display area of the device unless scattered by one or more scattering regions of the layer, whereby said scattering regions may be rendered visible against a background of contrasting appearance behind and out of optical contact with said display device.

* * * * *